Patented May 27, 1947

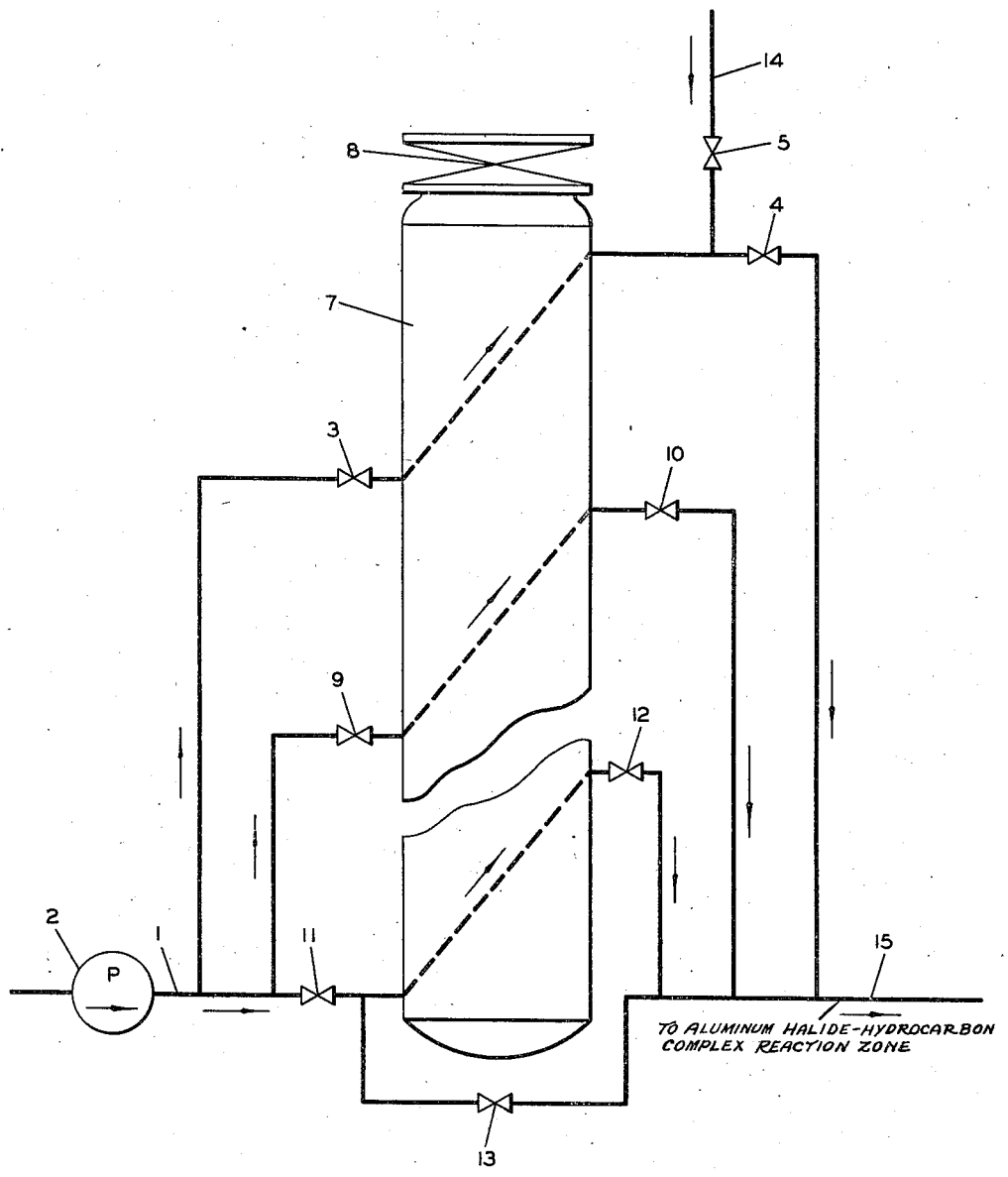

2,421,326

UNITED STATES PATENT OFFICE 2,421,326

REFORTIFICATION OF ALUMINUM HALIDE-HYDROCARBON COMPLEX CATALYSTS

John L. Groebe, William B. Reeves, and Daniel C. Campbell, Phillips, Tex., assignors to Phillips Petroleum Company, a corporation of Delaware Application January 17, 1946, Serial No. 641,716

3 Claims. (Cl. 260—683.4)

This invention relates to improved methods for refortifying Friedel-Crafts type hydrocarbon complex catalysts. In one particular aspect it relates to improvements in methods for adding aluminum halide to such catalysts in the reaction zone and in another particular aspect it relates to improvements in methods for suspending aluminum halide in hydrocarbon feed streams which are not reactive with the suspended aluminum halide.

Aluminum halide-hydrocarbon complex catalysts are widely used in commercial processes for the conversion of hydrocarbons. Isomerization and alkylation are typical examples of hydrocarbon conversion reactions wherein such catalysts are employed commercially.

These catalysts are usually prepared by agitating kerosene, a high boiling alkylate fraction, or other hydrocarbon mixture of suitable boiling range with aluminum halide. This results in the formation of two liquid phases, a heavy lower phase containing the aluminum halide in a hydrocarbon complex of unknown structure and an upper phase composed of supernatant hydrocarbons. The upper phase is then drawn off and further amounts of aluminum halide are dissolved and/or suspended in the complex. This fortification of the catalyst is continued until the desired degree of catalytic activity is reached. The catalyst is then ready for use.

Any of the aluminum halides may be used to form such complex catalysts, but the cost of aluminum iodide is prohibitive. Aluminum bromide is also expensive but finds some use in processes where solubility of the halide in hydrocarbons is required. Aluminum chloride is the halide of aluminum used in most commercial processes because of its cheapness and availability in anhydrous granular form. This invention is especially effective when applied to the use of granular anhydrous aluminum chloride.

In use catalysts prepared as described above gradually lose their activity and must be refortified by further additions of aluminum halide. The usual methods for refortifying these catalysts include the steps of pumping a portion of the catalyst from the reaction zone under considerable pressure, depressuring to approximately atmospheric pressure, adding aluminum halide, suspending or dissolving the added halide in the catalyst and pumping the catalyst back to the reaction zone.

The use of these steps with aluminum chloride-hydrocarbon complex catalysts possesses many disadvantages. The catalyst as it comes from the reaction zone usually contains considerable quantities of low-boiling hydrocarbons and by decreasing the pressure to that of the atmosphere these valuable hydrocarbons are vaporized and lost. As these hydrocarbons vaporize the temperature of the catalyst is reduced and it becomes more viscous, making it necessary to heat the catalyst so that it can be pumped more easily. Aluminum chloride is added in finely granular form and is usually mixed with a propeller type mixer or similar means to form a slurry with the catalyst. This slurry is then returned to the catalyst zone, usually by means of pumps of the positive displacement type equipped with oil flush. The solids in the slurry cause many difficulties in pumping operations and the oil flush systems do not completely prevent corrosion. As a result the refortification system must be shut down frequently to repair pumps. Check valves are often plugged and the operator must strike them with a hammer in order to free them; a very dangerous practice since "Hastalloy" or other brittle corrosion resistant material is usually used in the piping and a piping failure allows the catalyst to escape at pressures of the order of 400 p. s. i. It is common for a refortification system to be shut down for about 50 per cent of the time to repair pumps and check valves. This causes irregular refortification of the catalyst, or requires duplication of apparatus with ensuing increased costs.

A method and apparatus for accomplishing refortification of aluminum chloride-hydrocarbon complex catalysts without the disadvantages mentioned above is greatly desired. Chenicek, in U. S. Patent 2,360,547 discloses the fortification of an aluminum chloride catalyst in the reaction zone by introducing aluminum chloride in solution in a feed stream composed essentially of isobutane and n-butane. This is accomplished by passing the feed upwardly through a pickup chamber containing granular aluminum chloride under conditions of temperature, pressure and fluid flow adjusted to dissolve the required quantity of aluminum chloride. This method of operation also has its disadvantages which prevent its application to all conditions. It is frequently highly undesirable to introduce the feed into the reaction zone under conditions necessary for the solution of the required amount of aluminum chloride. At temperatures of not more than 100° F. we have found that quantities of aluminum chloride sufficient for catalyst refortification cannot be dissolved in an isobutane feed stream, and it is often undesirable to pass the entire feed stream through a pickup chamber. We have also observed in pilot plant work, that it is impractical to pass an isobutane feed stream at temperatures of not more than 100° F. upwardly through a simple pickup chamber containing aluminum chloride, since under these conditions bridging and plugging occurs in the chamber until all fluid flow is stopped.

It is an object of this invention to provide an improved method and apparatus for refortifying aluminum chloride-hydrocarbon complex liquid catalysts.

Another object of this invention is to provide an improved method and apparatus for accomplishing such refortification without depressuring the catalyst and without passing aluminum chloride slurry through pumps.

Still another object of this invention is to provide an apparatus without moving parts for suspending aluminum chloride in liquid hydrocarbons which are not reactive therewith.

Other objects and advantages will become apparent to those skilled in the art as this disclosure proceeds.

We have found that granular aluminum chloride may easily be suspended in a stream of hydrocarbon feed by the use of suitable liquid velocities in the apparatus shown in the accompanying drawing, and may be carried in suspension to the reaction zone where it is effective in refortifying the catalyst.

Any hydrocarbon feed stream may be used so long as it is non-reactive toward aluminum chloride. Isoparaffin feeds to alkylation processes and paraffin or cycloparaffin feeds to isomerization processes are effective suspension media. Our invention is not limited to temperature and pressure conditions necessary to dissolve the aluminum chloride in the hydrocarbon feed stream but on the contrary is directed to suspending aluminum chloride in such feeds in quantities in excess of its solubility therein. Any solution in the stream is incidental but is not detrimental.

Our invention may be better understood by reference to the accompanying drawing which shows diagrammatically one illustrative embodiment thereof wherein an isobutane feed to an alkylation process is utilized to carry the aluminum chloride to the reaction zone. Our invention, however, is not limited to this particular process.

An isobutane feed stream enters the apparatus via line 1. It is driven by pump 2, located upstream of the apparatus. The chamber 7 has been filled with granular aluminum chloride through the closure 8. Valves 3 and 4 are opened and the hydrocarbon feed flows through the upper part of the bed of aluminum chloride, agitating the aluminum chloride and suspending a portion in the hydrocarbon stream. This is continued until the aluminum chloride in the upper portion of chamber 7 has been suspended in and carried away by the hydrocarbon feed stream, the effluent leaving valve 4 being led via line 15 to the reaction zone. Valves 9 and 10 are then opened and valves 3 and 4 are closed. The hydrocarbon feed stream then flows through that part of the aluminum chloride bed between valves 9 and 10 and aluminum chloride in this part of the chamber is gradually suspended in the feed. This type operation is continued until the aluminum chloride in the bottom portion of the chamber has been suspended in the hydrocarbon feed entering at valve 11 and leaving at valve 12. Valves 11 and 12 are then closed and valves 5 and 13 are opened. Gas under pressure then enters via line 14 and forces residual liquid out of chamber 7 via valve 13 and line 15. Valves 13 and 5 are then closed, chamber 7 is vented to atmospheric pressure and is refilled with granular aluminum chloride via closure 8 (shown as a large valve).

Chamber 7 may be made of any convenient height and may be equipped with any desired number of inlets and outlets. Suspension of solid particles by this method is chiefly limited by three variables:

(1) Velocity of the suspending medium,
(2) Density of the suspended matter, and
(3) Particle size.

When the size of the aluminum chloride particles to be used has been chosen two of these variable have been fixed leaving only the velocity variable. This is approximately inversely proportional to the cross section of the chamber. An optimum chamber diameter should be chosen to contain a volume of aluminum chloride between the level of each inlet and the corresponding outlet sufficient to permit a convenient cycle of operations without decreasing the velocity of the hydrocarbon feed below that at which efficient suspension of aluminum chloride occurs. The linear velocity of isobutane through the chamber should be 0.1 to 0.3 feet per second when 40 mesh aluminum chloride is used and outlets are from 1 to 3 feet above inlets. The optimum velocity may be easily determined by experiment in each case by methods within the ordinary skill of the art.

The vertical distance between an inlet and its corresponding outlet has a maximum beyond which operation is impracticable. This distance if exceeded will cause operational difficulties due principally to plugging in inlet lines. This distance is easily determined by experiment in each case. We have received excellent operational results by limiting the vertical distance between inlet and outlet to approximately one-half the maximum operative distance experimentally determined.

We have found that locating the outlet above and at an acute angle to the horizontal plane of the inlet gives best results in preventing plugging and bridging. A preferred location for the outlet is diametrically across the chamber from the inlet and above the inlet by about one-half the maximum operable distance.

*Example I*

A pilot plant was constructed having a cylindrical aluminum chloride chamber 8 inches in diameter and 6 feet high. One inch inlets were spaced at 1, 3 and 5 feet from the bottom of the chamber and 1 inch outlets were placed at 3 inches from the top and 3 inches from the bottom on the opposite side. Aluminum chloride of 40 mesh size was used in a series of runs in which an isobutane stream was passed through the chamber both upward and downward at rates of flow varying from 350 to 870 gallons per hour. Difficulties caused by plugging were observed with downward flow. At the higher rates of flow no difficulties in operation were encountered when the iso-butane stream was directed upward through the chamber. At 350 gallons per hour operation with the outlet 4 feet 9 inches above the inlet was impractical because of plugging but no difficulties were found by operating with the outlet 2 feet 9 inches above the inlet.

Example II

A full scale plant to refortify aluminum chloride-hydrocarbon complex catalyst used in an alkylation process was constructed as shown in the drawing. The diameter of the aluminum chloride chamber was chosen as 20 inches as suitable for containing a quantity of 40 mesh aluminum chloride sufficient to give a convenient operating cycle and to allow a linear velocity of the isobutane of .17 feet per second, corresponding to a rate of flow of 10,000 gallons per hour. Outlets were arranged diametrically opposite to inlets and 2 feet above the inlets. No operational difficulties have been encountered with this equipment and good refortification of catalyst by suspended aluminum chloride has been obtained.

We claim:

1. In a hydrocarbon conversion process wherein an isoparaffin is a reactant in the presence of an aluminum halide-hydrocarbon complex catalyst which requires refortification that improvement which comprises passing an incoming stream of isoparaffin feed in a net effective direction of flow extending upwardly at an acute angle through an upper portion of a chamber containing granular aluminum halide, controlling the rate of flow of said stream of isoparaffin feed so the amount of aluminum halide required for catalyst fortification becomes suspended in the isoparaffin stream during its passage through the upper portion of said chamber, after aluminum halide has been removed from said upper portion of the chamber passing said incoming stream of isoparaffin in a net effective direction of flow extending upwardly at an acute angle through a lower portion of said chamber containing aluminum halide, controlling the rate of flow of said stream so that the amount of aluminum halide required for catalyst refortification becomes suspended in the isoparaffin during its passage through said lower portion of the chamber, withdrawing isoparaffin containing suspended aluminum halide from the chamber, introducing this effluent into a reaction zone and there contacting it with the aluminum halide-hydrocarbon complex catalyst requiring fortification.

2. The process of claim 1 wherein the aluminum halide is aluminum chloride and the isoparaffin feed stream is maintained at a temperature of not more than 100° F.

3. The process of claim 1 wherein the isoparaffin feed stream is an isobutane stream.

JOHN L. GROEBE.
WILLIAM B. REEVES.
DANIEL C. CAMPBELL.

REFERENCES CITED

The following references are of record in the file of this patent:

UNITED STATES PATENTS

| Number | Name | Date |
|---|---|---|
| 2,403,342 | Day | July 2, 1946 |
| 2,395,263 | Foster | Feb. 19, 1946 |
| 2,360,547 | Chenicek | Oct. 17, 1944 |
| 2,337,419 | Sensel | Dec. 21, 1943 |